Sept. 28, 1926.
G. W. PRATHER
1,601,261
DEVICE FOR TESTING WHEEL CANT
Filed Jan. 12, 1926
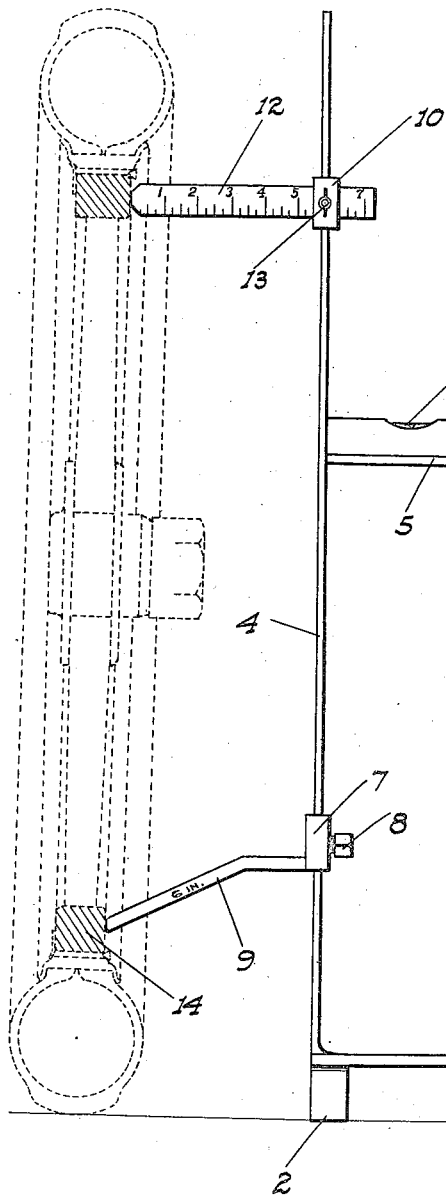
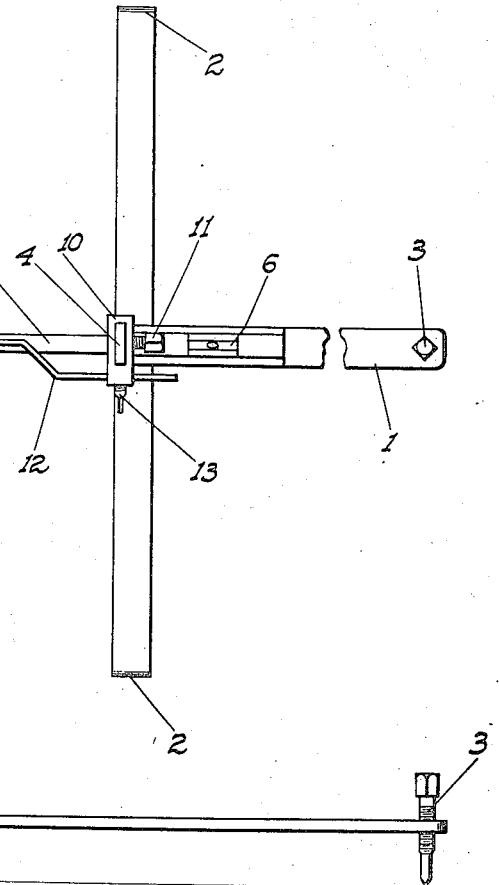
INVENTOR
G. W. Prather
BY
ATTORNEY Patented Sept. 28, 1926.

1,601,261

UNITED STATES PATENT OFFICE.

GEORGE W. PRATHER, OF SANTA CRUZ, CALIFORNIA.

DEVICE FOR TESTING WHEEL CANT.

Application filed January 12, 1926. Serial No. 80,723.

This invention relates to devices for testing the cant of the front wheels of automobiles, to enable the amount of cant to be determined and corrections made if necessary.

Ordinarily testing for wheel cant is done by means of a plumb bob and line, which is a crude and unsatisfactory method, and with which it is hard to obtain the accurate results, which are especially desirable with wheels equipped with balloon tires, with which an excessive amount of cant induces an undue rapidity of wear of the tires.

The principal object of my invention is to do away with the above mentioned crude method by providing a simple and inexpensive and easily adjusted implement by means of which the cant of a wheel can be easily and accurately determined; and which can then be set to serve as a gage for straightening operations, if such are necessary.

These objects I accomplish by means of such structure and relative arrangement of parts as will fully appear by a perusal of the following specification and claims.

In the drawings similar characters of reference indicate corresponding parts in the several views:

Fig. 1 is a side elevation of the device as shown in operation with a wheel.

Fig. 2 is a top plan view of the structure.

Referring now more particularly to the characters of reference on the drawings, the numeral 1 denotes a rigid base member of suitable character having at its forward end a pair of rigid and widely but symmetrically separated feet 2, and at the opposite end a single foot in the form of an adjustable set screw 3. This arrangement of course provides a three point mounting for the base, eliminating the possibility of the device wabbling when in use.

Projecting upwardly from the front end of the base is a rigid standard 4 disposed at a true right angle to the base. Intermediate its ends the standard is provided with a rearwardly projecting horizontal bracket 5 on which is mounted a spirit level 6 of standard form.

Between the bracket 5 and base 1 a sleeve 7 is slidable on the standard, being held at any desired point by a set screw 8. A rigid finger 9 preferably having a downward slant toward its outer end is rigidly fixed on the sleeve 7 to project forwardly from the standard an arbitrary predetermined distance.

Another sleeve 10 is slidable on the standard above the bracket 5 being held at any desired position by a set screw 11. Slidable through the sleeve 12 to one side of the standard 4 is a horizontal and graduated scale 12. This scale projects forwardly of the standard and has its forward end in transverse vertical alinement with that of the finger 9. This scale is held at any position in the sleeve independent of any vertical adjustment of the latter by a set screw 13. The forward edge of the sleeve 10 serves as a fixed mark against which the graduations of the scale are read. These graduations are so arranged that a reading on the scale from the outer or zero end thereof to said sleeve will be the same length as the finger 9 from its outer end to the sleeve 7, when the outer ends of said finger and scale are in true vertical alinement with each other.

To use the device it is moved to a point adjacent a wheel to be tested, so that the vertical line between the scale and the finger passes through the vertical center of the wheel, said scale and finger being positioned so as to project laterally from the wheel at right angles thereto. This positioning of the device relative to the wheel can be gaged by eye with sufficient accuracy for the purpose.

The set screw foot 3 is then adjusted if necessary, with the spirit level as a guide, to insure that the standard 4 is truly vertical, assuming that the car is resting on a level floor transversely. The sleeve 7 is then adjusted and the base 1 moved toward the wheel so that the outer end of the finger 9 bears against the lower outer face of the felly 14 of the wheel. The scale 12 if necessary is retracted through its sleeve so that so far said scale will not engage the wheel.

The sleeve 10 is then adjusted vertically and the scale is moved outwardly until it abuts against the outer face of the felly at its upper end. A reading of the scale against the sleeve 10 deducted from the known length of the finger 9 (which is preferably six inches) will be of course the actual cant of the wheel between the opposite ends of the felly.

Assuming for example that this reading denotes too much cant, as determined by the best practice, the implement is pulled away slightly from the wheel, the scale is moved and set so as to project the proper distance relative to the finger, and the device is then again moved so that the scale abuts against the felly.

The finger 9 will then of course be clear of the felly. The wheel is then straightened out by any means used in the industry until both the scale and the finger abut against the felly.

Operations on this wheel are then finished and the device may be moved to the opposite side of the car to be used to test the other wheel.

The two sleeves have sufficient adjustment on the standard to enable the space between the finger and sleeve to be such as to accommodate their use to any diameter felly used on automobiles. The finger has a downward slant toward its outer end as shown and described in order to enable said finger to be used in connection with a rim or felly which is quite close to the floor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device for testing wheel-cant including a vertical standard, vertically spaced testing elements projecting from one side of the standard, and means for enabling the standard to be accurately set in a true vertical position.

2. A device for testing wheel-cant including a vertical standard, vertically spaced testing elements projecting from one side of the standard, means mounted in connection with the standard for determining the vertical alinement thereof, and means for enabling any misalinement of the standard from the vertical to be corrected.

3. A device for testing wheel-cant including a base, a vertical standard thereon, vertically spaced testing elements projecting from one side of the standard, a level indicator mounted in connection with the standard, feet spaced apart in a plane at right angles to the elements and supporting the base at one end, and an adjustable set screw, forming a third leg, supporting the base at the other end.

4. A device for testing wheel-cant comprising a base, a standard projecting upwardly from the base adjacent one edge of the same, a scale projecting from one side of the standard, a finger projecting from the same side of the standard below the scale, and means supporting the finger on the scale for vertical adjustment thereon; the finger having a downward slant toward its outer end whereby to enable said outer end to be lowered to a point below the level of the base.

In testimony whereof I affix my signature.

GEORGE W. PRATHER.